United States Patent [19]

Cavazza

[11] Patent Number: 5,154,035
[45] Date of Patent: Oct. 13, 1992

[54] MACHINE FOR WRAPPING CIGARETTE PACKS, OR THE LIKE, INTO SHEETS OF A WRAPPING MATERIAL

[75] Inventor: Roberto Cavazza, Rianoro, Italy
[73] Assignee: Sasib S.p.A., Bologna, Italy
[21] Appl. No.: 702,327
[22] Filed: May 20, 1991
[30] Foreign Application Priority Data
  Jun. 29, 1990 [IT] Italy .................. 12479 A/90
[51] Int. Cl.$^5$ .............................. B65B 19/28
[52] U.S. Cl. .......................... 53/77; 53/234; 53/375.9
[58] Field of Search ............ 53/77, 234, 375.9

[56] References Cited

U.S. PATENT DOCUMENTS

| | | | |
|---|---|---|---|
| 3,982,380 | 9/1976 | Seragnoli | 53/77 |
| 3,984,963 | 10/1976 | Seragnoli | 53/77 |
| 4,020,608 | 5/1977 | Seragnoli | 53/234 |
| 4,073,123 | 2/1978 | Schoppee | 53/234 |

Primary Examiner—John Sipos
Attorney, Agent, or Firm—Larson and Taylor

[57] ABSTRACT

A machine for wrapping cigarette packs (P), or the like, each into a wrapping material sheet (F), which including a stepwise-operatable spoke wheel (1) formed with a plurality of outwardly open radial pockets (4) which are for receiving packs (P) with the relative wrapping material sheet (F) from a feeding station (A), each pocket (4) being provided at the trailing end of its mouth—relative to the direction of rotation of the spoke wheel (1), with the radial teeth (214) for retaining in position the trailing flap (L1) of the wrapping material sheet flaps (L1, L2) which are folded on the respective pack by a folder device (5, 6). The folded flaps (L1, L2) are welded together by welding device (7, 8) which are imparted with a radially directed reciprocating motion between the one and the successive step of the spoke wheel (1), so that any interference is avoided with the retaining teeth (214). The welding device (7, 8) are operated by driving device which consist of main driving device (10, 11) and an auxiliary driving device (18) that is timely set in action only when the operation of the main driving device is discontinued, whereby the function and the integrity of the machine is guaranteed.

6 Claims, 2 Drawing Sheets

MACHINE FOR WRAPPING CIGARETTE PACKS, OR THE LIKE, INTO SHEETS OF A WRAPPING MATERIAL

SUMMARY OF THE INVENTION

The invention relates to the so-called cellophaning machines, which are for wrapping packs substantially having the shape of a rectangular parallelepiped, particularly for wrapping cigarette packs, individually into a generally transparent wrapping material sheet which is rather flexible, and/or is liable to be affected by static electricity.

More specifically, the invention relates to those cellophaning machines comprising a spoke wheel with a plurality of angularly equispaced, outwardly open radial pockets which by the indexed rotation of the spoke wheel, are successively moved into a feeding station, wherein each pocket will receive a pack and the relative wrapping material sheet, which is already "U"-bent around its pack, and has its radially directed flaps protruding outwardly from the pocket mouth. Of these flaps, the flap which is the trailing flap —relative to the spoke wheel direction of rotation, is first folded by a reciprocating folder, and the leading flap is then folded over the folded trailing flap by a stationary folder, as the spoke wheel is being rotated by one step. Nextly, these flaps of a pack wrapper are welded together by one or more welding means which are arranged around the spoke wheel, at locations further downstream of the feeding station—still relative to the spoke wheel direction of rotation, and which are apt to bear on the radially outward pack side.

In a cellphaning machine of this type, in order that a wrapping material sheet be tightly wrapped around the respective pack, the reciprocating folder is required to work so as to closely graze the radially outward pack side. However, while the said reciprocating folder is being caused to perform its backward stroke, and/or while the spoke wheel is being nextly rotated by one step, the undesired result is that the first folded, radially directed trailing flap of a pack wrapper tends to slide backwards owing to friction and/or to an attraction due to electrostatic phenomena, particularly when this wrapper is of a soft material. Therefore, the wrapping material sheet comes to be loosely wrapped around its pack.

The solution to this problem is proposed in the Italian Patent Application No. 12616 A/88 of the same Patentee, the object of which is a cellophaning machine of the above-disclosed type, wherein each pocket in the spoke wheel is provided at the trailing end edge of its radially outward mouth —still relative to the direction of rotation of this wheel, with one or more retaining teeth which slightly protrude radially from the outward side of a pack, once this pack has been fully accomodated into its pocket, the said teeth being provided for clamping the trailing flap of a pack wrapper, so as to hold the pack in a quite flat and laid condition. Open slots in the reciprocating folder and grooves in the stationary folder are provided in a matching relation with the said teeth, for allowing the teeth to pass therethrough.

In order to prevent any interference between the teeth and the welding means, and since it is not possible to have suitable grooves provided for the welding means, which grooves would hinder the continuity of the welding lines, and so the tightness of the pack wrappers, in the said Patent Application there is proposed that each pack be shifted at the welding stations, radially within the pocket in which it is housed, with its outward side being moved beyond the teeth, whereby the pack will be thus put in touch with the respective welding means, which can be then left in a substantially stationary condition.

However, the practical experience demonstrated that such a radial shifting of each pack within its respective pocket housing the same, may cause the wrapper thereof to become badly formed. In fact, owing to any frictional resistance between the contacting pack-and-wrapper surfaces, the wrapping material sheet may be caused to take, relative to its pack, a position other than its original position.

The present invention aims to overcome also this drawback and, to this end, its object is a cellophaning machine of the type as described at the outset, wherein while the retaining teeth are still used, the aforementioned radial movement of the packs can be given up, by providing for a welding means or for welding means to be imparted a reciprocating motion by means of a driving device which guarantees that the welding means and the said teeth will not interfere with each other.

Typically, the said driving device consists of a main actuator, preferably in form of a stepwise-operated motor having the task of normally actuating a welding means or the welding means, and also consists of an auxiliary actuator which will prevent—before the spoke wheel being rotated by one step and after a welding having been made, any interference between the retaining teeth and a welding means or the welding means, by causing these means to be withdrawn from the radially outward side of a wrapped pack, whenever such a withdrawing movement cannot be promoted by the main actuator, owing to the same falling out of step, or for any other reason.

These and other features of the invention, and the advantages arising therefrom, will clearly appear in the following detailed description of one preferred embodiment thereof, which is made by way of a non-limiting example and is very diagrammatically shown in the annexed sheets of drawing.

DESCRIPTION OF THE PREFERRED EMBODIMENT

Figure 1:
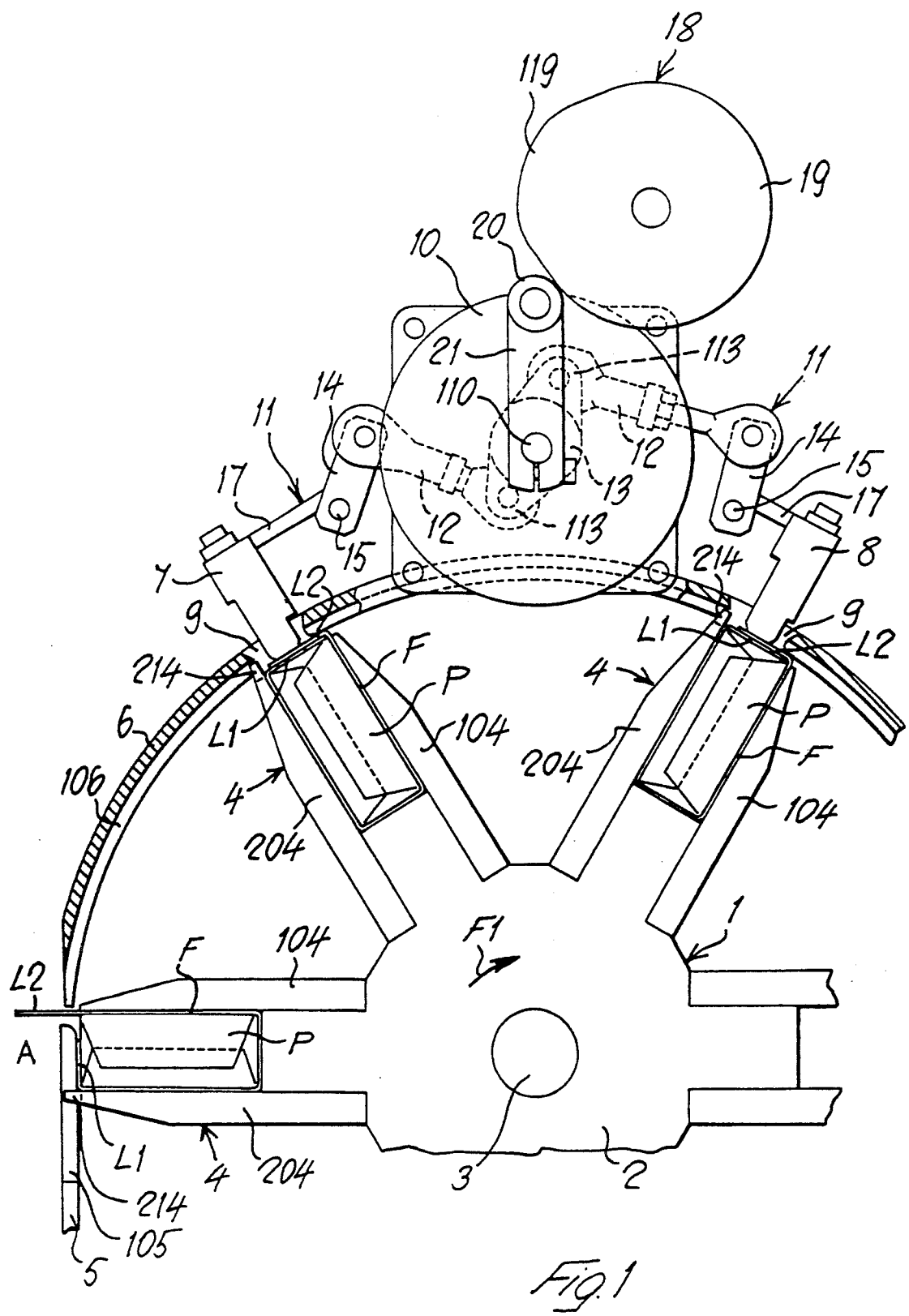
FIG. 1 is a front view, with parts broken away, of a cellophaning machine according to the invention.

Referring to FIG. 1, a cellophaning machine, according to the invention, comprises a spoke wheel 1 consisting of a rotary drum 2 mounted on to a shaft 3. The drum 2 is provided with a plurality of angularly equispaced radial pockets 4 which are each formed by at least one pair of spaced apart radial arms 104, 204, respectively providing the leading and the trailing side of a pocket—relative to the direction of rotation of the spoke wheel 1, as shown by arrow F1.

The spoke wheel 1 is stepwise rotated so as to have each pocket 4 moved into a feeding station A, where it will receive a cigarette pack P which is arranged therein with its major axis lying parallel to shaft 3, and with its radially outward side slightly projecting from the respective end edge of arms 104, 204. Before a pack being inserted into its pocket, a wrapping material sheet F is interposed between the pack and the pocket, and while this sheet is being inserted into its pocket, it is "U"-wrapped around the pack, with both of its flaps L1, L2 being left beyond the pocket mouth.

At the feeding station A a reciprocating folder 5 is provided, and has the task of folding the trailing flap L1 of a wrapping material sheet F on a pack P, once the pack has been accomodated into its respective pocket 4.

Downstream of the station A—relative to the direction of rotation F1 of wheel 1, an arcuate stationary folder 6 is arranged, and as the wheel is being nextly rotated by one step, this folder will fold the leading flap L2 of said wrapper over the previously folded flap L1.

The trailing arm 204 of each pocket 4 is provided at the radially outward edge of its free end with a retaining tooth 214 which by preventing any backward movement of the already folded flap L1, helps to keep the sheet F tightly wrapped around a pack P.

In order to avoid that the folders 5 and 6 may interfere with the teeth 214, these folders are provided respectively with an open slot 105 and a radial groove 106, which are formed in a matching relation with the said teeth.

The overlapped flaps L1 and L2 of a wrapping material sheet F for each pack P, are welded together at two successive steps of the spoke wheel 1, by a pair of welding means 7 and 8 arranged downstream of station A. These welding means which are allowed to contact the relative pack through a respective opening 9 formed in the stationary folder 6, are imparted an alternate oscillatory motion, such that the welding means will be moved from an active flap-welding position against the pack wrappers, into an inactive position away from the packs, in which any interference between the welding means and the aforementioned retaining teeth 214 is prevented.

Figure 2:
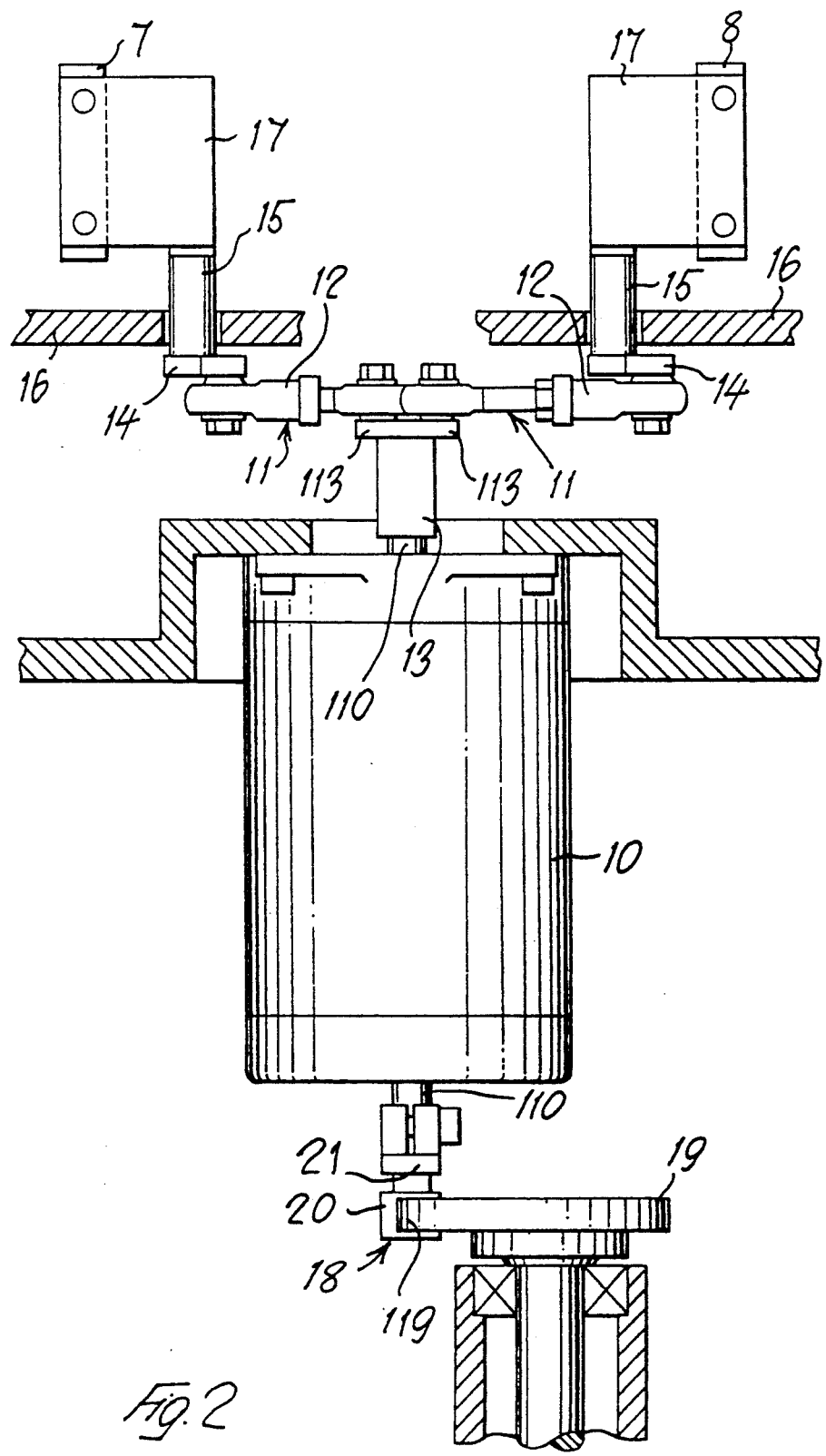
FIG. 2 is a corresponding top plan view of the said machine.

The actuation of the welding means 7 and 8 synchronously with the indexed rotation of the spoke wheel 1, is normally derived from a stepwise-operated motor 10, through a pair of linkages 11 which connect the said welding means to the shaft 110 of the said motor (see also FIG. 2).

Preferably, each linkage 11 comprises a rod 12 which is adjustable in length, and one end of this rod is pivotally connected to the respective one of two diametrically opposite ears 113 formed in a head 13 keyed onto the shaft 110 of motor 10, while the opposite end of said rod is pivotally connected to a lever 14 which in turn carries a pivot pin 15 pivotably engaged in a supporting member 16. Secured to this pivot pin 15 is a small plate 17, and the body of the respective one of the welding means 7, 8, is mounted on to this plate.

When the shaft 110 of motor 10 is rotated over a fraction of a turn, alternately in the one and the contrary direction, possibly with the aid of return spring means (not shown), the two welding means 7 and 8 will be moved, through the said drive transmission linkages 11, in the manner as described above.

Typically, the invention provides for an auxiliary device 18 to be operatively associated with the stepwise-operated motor 10, having the task of actuating the welding means 7 and 8 whenever the motor 10 cannot, for any reason, perform its function. Thanks to the provision of such an auxiliary device, a continuous operation of the cellophaning machine is thus ensured, and particularly any interference between the welding means 7 and 8 and the retaining teeth 214 is in any case avoided, whereby the integrity of this machine is safeguarded.

According to one preferred embodiment of the auxiliary driving device, for which reference should be made to both Figures, the said auxiliary driving device 18 comprises a rotary cam 19, with a roller 20 being engageable therewith and being mounted on a lever 21 in turn keyed onto the rear end of shaft 110 of motor 10, which is the shaft end lying opposite to the shaft end carrying the head 13. The rotary cam 19 is provided with such a profile that a reciprocating oscillatory motion, which is just like the reciprocating oscillatory motion as promoted by the stepwise-operated motor 10, will be imparted to the shaft 110 through the roller 20 and the lever 21, and so the the welding means 7, 8, through the linkages 11. However, the cam 19 is operated with a little delayed phase difference relative to the motor 10, so that in normal conditions, it is this motor that actually drives the welding means, while the cam is only allowed to ligthly touch the cooperating roller 20, with no force being transmitted from the cam to the roller, the said can being however ready for engaging the said roller, in case the operation of the main motor 10 should fail. Of course, the delayed operation of the cam 19 must be so calculated that, whenever needed, this cam will be allowed to actuate the welding means, and particularly withdraw the welding means from the respective packs, before the spoke wheel 1 having been nextly indexed by one step. The cam 19 is imparted a continous rotary motion, and since it is provided with only one peripheral projection 119, the same must be caused to make one turn for every step of the spoke wheel 1.

In the shown embodiment, the auxiliary driving device is of a very simple construction, and affords an automatic, extremely reliable operation, and such positive features mainly result from a continuously rotated cam being used as a control means, which is set in action only in those generally rare occasions in which the normal operation of the main driving device is discontinued.

I claim:

1. A machine for wrapping packs (P) substantially having the shape of a rectangular parallelepided individually into a wrapping material sheet (F),
    said machine comprising a spoke wheel (1) with a plurality of angularly equispaced radical pockets (4) which are radially outwardly open and which by the indexed rotation of the spoke wheel (1) are successively moved into a feeding station (A) wherein each said pocket (4) receives a pack (P) and the relative wrapping material sheet (F) which wrapping material sheet on being inserted into the respective pocket (4) is "U"-bent around the associated pack (P) with radially directed flaps (L1, L2) protruding from a mouth of the associated pocket (4), and of said flaps, (a) a trailing flap (L1) which is trailing relatitive to the direction of rotation of the spoke wheel (1) is first folded on a respective, radially outward end side of a pack (P) by a reciprocating folder (5) arranged in the feeding station (A) and a leading flap (L2) is then folded over the first folded trailing flap (L1) as the spoke wheel (1) is next rotated by one step by a stationary folder (6) mounted downstream of the feeding station (A), said pockets (4) being each provided at a trailing end edge of the associated radially outward mouth relative to the direction of rotation of said wheel (1) with one or more retaining teeth (214) which slightly protrude radially from an outward side of a pack (P) once this pack has been fully accommodated into the associated said pocket (4), and open slots (105) in the reciprocating folder (5) and grooves (106) in the stationary folder (6) are provided in a matching relation with said teeth for allowing the teeth to pass therethrough, and welding means (7, 8) provided and arranged around the spoke wheel (1) downstream of the feeding station (A) for welding together said overlapped trailing and leading flaps (L1, L2) of the wrapping material sheet (F) for each single pack (P), said machine being characterized in that it comprises a main driving means (10, 11) for actuating the welding means (7, 8) so as to move the welding means in a substantially radial direction between the one and the successive step of the spoke wheel (1) reciprocatingly from an active flap-welding position in which the welding means is moved into contact with the radially outward end side of a pack (P) into an inactive position in which the welding means is withdrawn from the respective pack (P) to a sufficient degree for preventing any interference with said teeth (214) in pockets (4) on the spoke wheel (1) being next indexed by one step, and an auxiliary driving means (18) operatively associated with said main driving means (10, 11) which is set in action for promoting, whenever the operation of the main driving means should be discontinued for any reason, at least the radial withdrawing from the relative pack (P) of said welding means (7, 8), so as to move the welding means into the inactive position before the spoke wheel (1) is next indexed by one step, and wherein the auxiliary driving means (18) comprises a rotary cam (19) with a roller (20) engageable therewith and mounted on a lever (21) which in turn is keyed onto a shaft (10) of a stepwise-operated motor (1), said rotary cam (19) being provided with such a profile that a reciprocating oscillatory motion which is just like the reciprocating oscillatory motion as promoted by said stepwise-operated motor (10) is imparted to the shaft (110) of the stepwise-operated motor (10) and so to the welding means (7, 8), said cam (19) being operated with a little delayed phase difference relative to the stepwise-operated motor (10) so that in normal conditions it is this motor that actually drives the welding means (7, 8) while the cam (19) is only allowed to lightly touch the cooperating roller (20) with no force being transmitted from the cam to the roller, said cam being however ready for engaging said roller in case the operation of the stepwise-operated motor (10) should fall whereby the welding means is suitably actuated before the spoke wheel (1) is next indexed by one step.

2. The wrapping machine according to claim 1, in which the said auxiliary driving means (18) is so provided that whenever needed, the same will be caused to move the welding means (7, 8) reciprocatingly into its active, and into its inactive position.

3. The wrapping machine according to claim 1, in which the said auxiliary driving means (18) is so provided that the same is continuously kept in motion, and is automatically connected with the welding means (7, 8) only when the operation of the main driving means (10, 11) should be discontinued.

4. The wrapping machine according to claim 1, in which the welding means is imparted with a reciprocating oscillatory motion in a substantially radial direction.

5. The wrapping machine according to claim 1, in which the said main driving means (10, 11) comprises the stepwise-operated motor (10) and at least one linkage (11) which connects the shaft (110) of the said stepwise-operated motor (10) to the welding means (7, 8).

6. The wrapping machine according to claim 5, in which each linkage (11) comprises a rod (12) which is adjustable in length, and one end of this rod is pivotally connected to the respective one of two diametrically opposite ears (113) formed in a head (13) keyed onto the shaft (110) of the stepwise-operated motor 10, while the opposite end of said rod (12) is pivotally connected to a lever (14) carrying in turn a pivot pin (15) which is pivotably engaged in a supporting member (16), a small plate (17) being secured to the said pivot pin (15), with the body of the respective welding means 7, 8 being mounted on to the said plate.

* * * * *